Patented Aug. 27, 1940

2,212,783

UNITED STATES PATENT OFFICE 2,212,783

CYSTEINE SULPHINIC ACID AND METHOD OF THE PREPARATION THEREOF

Theodore F. Lavine, Ardmore, Pa.

No Drawing. Application March 11, 1938,
Serial No. 195,413

7 Claims. (Cl. 260—534)

The object of the present invention is the preparation of a new sulphinic acid compound of cysteine, which has an empirical formula of $C_3H_7NSO_4$. The structural formula of the compound to be prepared may be represented by

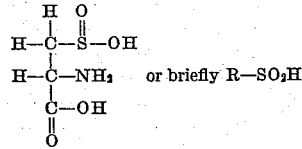

wherein R represents the radical $HOOC \cdot CH(NH_2) \cdot CH_2$—

R is used hereinafter to indicate the radical $HOOC \cdot CH(NH_2) \cdot CH_2$—

A compound of similar nature has been prepared by M. P. Schubert (Journal of the American Chemical Society, vol. 55, 1933, pages 3336 to 3342). Such compound, however, as may be shown by its analysis and the optical rotations of its solutions does not correspond to the compound which is the object of the present invention. The product of Schubert was prepared by the oxidation of a cobalt complex of cysteine and subsequent replacement of the oxidized cysteine in the complex by ethylene diamine, in accordance with the following outlines, wherein "en" designates ethylene diamine:

$(Co(RS)_3) \equiv + H_2O_2 \rightarrow (Co(RSO_2)_3) \equiv$
$2(Co(RSO_2)_3) \equiv + 3en \rightarrow$
$\qquad Co(en)_3 \cdot (Co(RSO_2)_3 \div 3RSO_2^-$ Schubert considered the compound obtained to be a hydrated sulphinic acid of the formula $R \cdot SO_2H \cdot H_2O$ According to the results of the ultimate analysis of his product, there were found C=21.42%; H=5.37%; N=8.20%; S=18.84%. These correspond substantially to those calculated for $R \cdot SO_2H \cdot H_2O$ namely, C=21.04%; H=5.31%; N=8.18%; S=18.70%.

The only other chemical analysis reported by Schubert is the oxidation of the compound obtained by him to cysteic acid with $KMnO_4$.

Tests have been made with the compound prepared according to Schubert's process to determine whether the water of hydration could be driven off. However, heating in vacuum to temperatures over 100° C. caused no loss in weight.

The new compound, which is the object of the present invention, upon analysis, is found to be a compound having the formula $R \cdot SO_2H$ rather than a hydrated compound. Solutions of the new compound also possess different optical rotations than those of the compound of Schubert. This difference is greater than could be caused by the water present in the compound of Schubert. Solutions of Schubert's compound have optical rotations of $[\alpha]_{Hg}^{25} = +10.9°$ in NHCl and —12.7° in water, whereas, those of the new acid prepared in accordance with the present invention have optical rotations of $[\alpha]_{Hg}^{27-28} = +33.4°$ in NHCl and +11° in water. This difference is more fundamental than one of water content and may possibly be attributed to structural isomerism, as for instance,

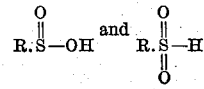

The new sulphinic acid of cysteine is prepared by the decomposition of cystine disulphoxide in an aqueous alkaline solution with the formation of cystine and cysteine sulphinic acid salt. Although it is known that certain aromatic disulphoxides may be decomposed with alkaline solutions, it does not appear that this process has been applied to cystine disulphoxide and, furthermore, it was not apparent that a new cystine sulphinic acid could be produced thereby. More specifically, in accordance with the present invention, the cystine disulphoxide is treated with sufficient alkali to react as follows:

$3R(SO)_2R + 4NaOH \rightarrow RSSR + 4RSO_2Na$

The alkaline agent employed may be caustic alkalies, ammonia or organic bases, such as methylamine or diethylamine. The volatile bases as exemplified by ammonia and amines are more suitable for the isolation of the new compound since any excess base can be removed by volatilization leaving only cystine and a salt of the new cysteine sulphinic acid. The cystine can be separated by virtue of its insolubility in water. The cysteine sulphinic acid may be recovered by acidifying the solution, as for example, with HCl, and precipitating the free sulphinic acid by a suitable alcohol, for example, ethyl or methyl alcohol, which retains the salt of the base and the added acid in solution.

Example 1

10.88 grams of cystine disulphoxide are mixed with sufficient water to form a thin paste and then dissolved by the addition of 8.5 cc. of 33% methylamine in water. The solution is then evaporated to a pasty condition over $H_2SO_4$ in vacuo. The residue obtained is treated with water and filtered, and the filtrate is again evaporated. The residue is again treated with water and filtered. The filtrate, after decolorizing with charcoal, is evaporated in vacuo, and the residue is then dissolved in 5.34 cc. of 10 HCl, and 20 cc. of absolute alcohol are added. After allowing the solution to stand for two hours at 2° C., the resulting crystals of cysteine sulphinic acid are filtered and washed with 30 cc. of a four to one alcohol-water mixture. A yield of 5.72 grams of cysteine sulphinic acid is obtained having a decomposition point of 148° C. The product is free from chloride as well as cystine. The molecular weight of this product by acid titration is 152.0, by $I_2$ oxidation 152.3, and by HI reduction 153.6. Theoretical 153.1. The compound contains 9.15% nitrogen and 20.9% sulphur. Optical rotations $$[\alpha]_{Hg}^{27-28} = +33.4°$$

in 1-N HCl and $+11°$ in water.

Example 2

2.72 grams of cystine disulphoxide are decomposed with ammonia and the resulting solution is evaporated to incipient dryness, water is added and the evaporation repeated until no odor of ammonia remains. The residue is then treated with water and the precipitated cystine is filtered off. The resulting filtrate is decolorized with charcoal, and the theoretical amount of HCl is added. The solution is then evaporated to dryness; after dissolving in about 4 cc. of hot water, about 5 cc. of hot alcohol are added which causes separation of the hot liquid (about 60° C.) into two layers. Water is then added to the hot liquid until a homogeneous solution is again obtained. On cooling, tiny crystals of cysteine sulphinic separate out, amounting to .91 gram or 48% of theory, the properties of which are substantially the same as those given in Example 1.

While the invention has been described with reference to several preferred methods for carrying out the invention, it is obvious that suitable and convenient modifications may be made in the practical application of the invention without departing from the spirit of the invention.

I claim:

1. In a process for the preparation of cysteine sulphinic acid the step comprising decomposing cystine disulphoxide in an aqueous alkaline solution to form a salt of the alkaline material employed and cysteine sulphinic acid and cystine.

2. A process for the preparation of cysteine sulphinic acid comprising dissolving cystine disulphoxide in an aqueous alkaline solution to form a salt of the alkaline material employed and cysteine sulphinic acid and cystine, precipitating and removing cystine from a solution of the product in water, acidifying the product from which cystine has been removed and adding an alcohol to precipitate the cysteine sulphinic acid.

3. A process for the preparation of cysteine sulphinic acid comprising dissolving cystine disulphoxide in an aqueous solution of a volatile base to form a salt of the base and cysteine sulphinic acid and cystine, evaporating the resulting solution to incipient dryness, adding water and removing the precipitated cystine which has been formed, acidifying the product from which the cystine has been removed and adding a lower aliphatic alcohol to precipitate the cysteine sulphinic acid.

4. A process for the preparation of cysteine sulphinic acid comprising dissolving cystine disulphoxide in an aqueous solution of methylamine, evaporating the resulting solution to incipient dryness, adding water and removing the precipitated cystine which has been formed, acidifying the product from which the cystine has been removed and adding a lower aliphatic alcohol to precipitate the cysteine sulphinic acid.

5. A process for the preparation of cysteine sulphinic acid comprising dissolving cystine disulphoxide in an aqueous solution of ammonia, evaporating the resulting solution to incipient dryness, adding water and removing the precipitated cystine which has been formed, acidifying the product from which the cystine has been removed and adding a lower aliphatic alcohol to precipitate the cysteine sulphinic acid.

6. A process for the preparation of cysteine sulphinic acid comprising dissolving cystine disulphoxide in an aqueous solution of methylamine, evaporating the resulting solution to incipient dryness, adding water and removing the precipitated cystine which has been formed, acidifying the product which has been separated from cystine with HCl and adding ethyl alcohol to precipitate the cysteine sulphinic acid.

7. A process for the preparation of cysteine sulphinic acid comprising dissolving cystine disulphoxide in an aqueous solution of ammonia, evaporating the resulting solution to incipient dryness, adding water and removing the precipitated cystine which has been formed, acidifying the product which has been separated from cystine with HCl and adding ethyl alcohol to precipitate the cysteine sulphinic acid.

THEODORE F. LAVINE.